United States Patent
Wu

(10) Patent No.: US 6,874,018 B2
(45) Date of Patent: Mar. 29, 2005

(54) METHOD AND SYSTEM FOR PLAYING ASSOCIATED AUDIBLE ADVERTISEMENT SIMULTANEOUSLY WITH THE DISPLAY OF REQUESTED CONTENT ON HANDHELD DEVICES AND SENDING A VISUAL WARNING WHEN THE AUDIO CHANNEL IS OFF

(75) Inventor: Handong Wu, Los Angeles, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 808 days.

(21) Appl. No.: 09/779,017

(22) Filed: Feb. 7, 2001

(65) Prior Publication Data

US 2003/0212759 A1 Nov. 13, 2003

Related U.S. Application Data

(60) Provisional application No. 60/223,387, filed on Aug. 7, 2000.

(51) Int. Cl.[7] .............................................. G06F 15/16
(52) U.S. Cl. ........................ 709/219; 709/203; 709/217; 709/218
(58) Field of Search ............................... 704/3; 705/14; 709/203, 217–219, 224

(56) References Cited

U.S. PATENT DOCUMENTS

| 5,826,102 A | 10/1998 | Escobar et al. ............. 395/806 |
|---|---|---|
| 5,870,549 A | 2/1999 | Bobo, II ................. 395/200.36 |
| 5,901,287 A * | 5/1999 | Bull et al. .................... 709/218 |
| 5,918,211 A | 6/1999 | Sloane ......................... 705/16 |
| 5,948,061 A | 9/1999 | Merriman et al. .......... 709/219 |
| 6,009,409 A | 12/1999 | Adler et al. ................... 705/14 |
| 6,009,410 A | 12/1999 | LeMole et al. ............... 705/14 |
| 6,011,537 A | 1/2000 | Slotznick .................... 345/115 |
| 6,014,644 A | 1/2000 | Erickson ...................... 705/37 |
| 6,014,698 A | 1/2000 | Griffiths ...................... 709/224 |
| 6,018,710 A | 1/2000 | Wymblatt et al. ........... 704/260 |
| 6,055,510 A | 4/2000 | Henrick et al. ................ 705/14 |
| 6,064,967 A | 5/2000 | Speicher ........................ 705/1 |
| 6,094,677 A * | 7/2000 | Capek et al. ................. 709/219 |
| 6,094,681 A * | 7/2000 | Shaffer et al. ............... 709/224 |
| 6,101,485 A | 8/2000 | Fortenberry et al. .......... 705/27 |
| 6,128,663 A * | 10/2000 | Thomas ....................... 709/219 |
| 6,173,250 B1 * | 1/2001 | Jong ............................. 704/3 |
| 6,230,199 B1 * | 5/2001 | Revashetti et al. ......... 709/224 |
| 6,249,810 B1 * | 6/2001 | Kiraly ........................ 709/217 |
| 6,317,780 B1 * | 11/2001 | Cohn et al. ................. 709/217 |
| 6,332,127 B1 * | 12/2001 | Bandera et al. ............... 705/14 |
| 6,449,657 B2 * | 9/2002 | Stanbach et al. ........... 709/203 |
| 6,496,857 B1 * | 12/2002 | Dustin et al. ............... 709/219 |
| 6,505,169 B1 * | 1/2003 | Bhagavath et al. ......... 709/219 |
| 6,538,673 B1 * | 3/2003 | Maslov ....................... 709/217 |
| 6,738,803 B1 * | 5/2004 | Dodrill et al. .............. 709/218 |

OTHER PUBLICATIONS

"Ad Demos & Specs", "Second Wave" Ads http://advertising.broadcast.com/ad_demos/index.html, 3 pages.
"AudioBase and Dae Interactive Marketing Team to Deliver First Audio–Enabled Foreign–Language Banner Ad" http://www.dae.com/press.html, Jun. 21, 1999, 3 pages.
"Advertise on GRIT!" http://www.grit.net, 3 pages.

(Continued)

Primary Examiner—Le Hien Luu
Assistant Examiner—Quang Nguyen
(74) Attorney, Agent, or Firm—Zilka-Kotab, PC; Christopher J. Hamaty

(57) ABSTRACT

A method for providing advertising to a handheld computer operable to connect to a network. The handheld computer includes a screen for displaying visual content received from the network and configured for playing an audio message associated with the visual content. The method includes receiving a request for content from the handheld computer and associating an advertisement with the request for content. The requested content is sent to the handheld computer for display on the screen of the computer and the associated advertisement is sent to the computer for playing over an audio output device of the handheld computer.

25 Claims, 7 Drawing Sheets

OTHER PUBLICATIONS

Online Ads—"Streaming Audio Advertising Pricing" http://www.o-a.com/archive/1997/November/0097.html, Nov. 23, 1997, 2 pages.

"PDAGEEK Reviews"http://www.ugeek.com/hwswrev/pp-subhed.htm, 5 pages.

"Ubiquitous Advertising on the WWW: Merging Advertisement on the Browser" http://www5conf.inria.fr/fich_html/papers/P52/Overview.html, 8 pages.

"Speech Synthesis Markup Language Specification for the Speech Interface Framework" http://www.w3.org/TR/speech-synthesis, Aug. 8, 2000, 28 pages.

"Resource Description Framework (RDF) Schema Specification 1.0" http://www.w3.org/TR/rdf-schema/, Mar. 27, 2000, 25 pages.

"W3C Voice Browser Workshop Minutes" http://www.w3.org/UI/Voice/1998/Workshop/minutes-13oct98.html, Oct. 13, 1998, 22 pages.

"Speech Synthesis Markup Language Specification for the Speech Interface Framework" http://www.w3.org/TR/speech-synthesis, Jan. 3, 2001, 27 pages.

"Java Speech Markup Language Specification" http://java.sun.com/products/java-media/speech/forDevelopers/JSML/JSML.html, 17 pages.

"Click-a-Deal: Advertising to Your Cell Phone" http://www.thinkmobile.com/article/00/00/37, Aug. 15, 2000, 4 pages.

* cited by examiner

METHOD AND SYSTEM FOR PLAYING ASSOCIATED AUDIBLE ADVERTISEMENT SIMULTANEOUSLY WITH THE DISPLAY OF REQUESTED CONTENT ON HANDHELD DEVICES AND SENDING A VISUAL WARNING WHEN THE AUDIO CHANNEL IS OFF

RELATED APPLICATION

The present application claims the benefit of U.S. Provisional Patent Application Ser. No. 60/223,387, filed Aug. 7, 2000.

FIELD OF THE INVENTION

The present invention relates generally to handheld computing devices, and more particularly, to a method and system for delivering advertising content to users of handheld computing devices connected to a network such as the Internet through a wireless connection.

BACKGROUND OF THE INVENTION

Mobile communication devices such as cellular phones and personal digital assistants (PDAs) are becoming increasingly popular in light of their increasing ease of use as well as the increasing availability of wireless access to the Internet. These devices are often used to access information from the Internet at locations away from a user's home or office and may be used for on-line purchases. The recent development of on-line networks has led to on-line advertising. For example, on the Internet, advertisements often appear on a Web page as a banner on the top or bottom of the page. When the user views a Web page using a browser such as Internet Explorer or Netscape, the banner appears at the appropriate location on the computer screen. The Web page may include a number of banners which are to be displayed on the user's terminal in conjunction with the Web page. Typically, the banners are each stored as a separate file on a server and have their own URL (Uniform Resource Locator) address. When the Web page is initially transmitted from the server to the user's terminal, the browser receives the URL addresses for the banners and then requests that they be transmitted from the server on which they are stored to the user's terminal for display in conjunction with the Web page. The server on which the banners are stored may or may not be the same server on which the original Web page is stored.

Currently, many Web portals such as Yahoo and Netzero generate substantial revenue from banner advertisements or ad bars included in their delivered content. New methods of dynamic advertising based on the contents or characteristics of the user's own device allow advertisers to target their advertisement. Examples of dynamic advertising are described in U.S. patent application Ser. No. 09/430,263, entitled "Active Marketing Based on Client Computer Configurations", filed on Oct. 29, 1999, and U.S. patent application Ser. No. 09/704,061, entitled "Method and System for Utilizing Wireless Protocol Information for Marketing Opportunities", filed Oct. 30, 2000, which are incorporated herein by reference in their entirety. The disclosed methods utilize a marketing opportunity detection application that is used to analyze the configuration of the client computer and generate a list of marketing opportunities.

One predominant and intrinsically necessary feature of handheld computers is their small viewing screens. With the rapid deployment of Web sites for wireless handheld devices, it is vital for such providers to continue pushing ads to users, even if those users have the small screens associated with the handheld computers. However, because of the smaller screen size and slower connection bandwidth, it is typically unacceptable to the user to let an ad banner occupy a substantial portion of the limited screen.

Web based interactive devices, such as described in U.S. Pat. No. 6,018,710, provide a non-visual browsing environment for the World Wide Web. HTML documents are converted into an audio output and visual Web pages are replaced with audio output. One drawback to these audio systems is that the user is not able to view graphic images available on the Web sites.

There is, therefore, a need for a method and system for providing advertising messages to users of handheld computers which do not interfere with the viewing of visual content on the small screen of the handheld computer.

SUMMARY OF THE INVENTION

A method of the present invention is for providing advertising to a handheld computer operable to connect to a network. The handheld computer includes a screen for displaying visual content received from the network and is configured for playing an audio message associated with the visual content. The method generally comprises receiving a request for content from the handheld computer and associating an advertisement with the request for content. The requested content is sent to the handheld computer for display on the screen of the computer. The associated advertisement is also sent to the handheld computer for playing over an audio output device of the handheld computer.

In another aspect of the invention, a computer implemented method for providing advertising to a handheld computer generally comprises sending a request for visual content from the handheld computer to the network and receiving the requested content. The content is displayed on the screen of the handheld computer. The method further includes receiving an advertisement associated with the visual content and playing the advertisement on the handheld computer.

A computer program product of the present invention generally comprises computer code that receives a request for content from the handheld computer and associates an advertisement with the request for content. The product further includes computer code that sends the requested content to the handheld computer and sends the associated advertisement to the handheld computer for playing over an audio output device of the handheld computer and a computer readable medium that stores the computer codes.

A system for providing advertising to the handheld computer generally comprises a processor operable to receive a request for content from the handheld computer, associate advertisement configured for audio output with the requested content, send the requested content in a visual format to the handheld computer, and send the associated advertisement to the handheld computer for audio output therefrom while the requested content is displayed on the handheld computer. The system further includes memory for storing the requested content and advertisements.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
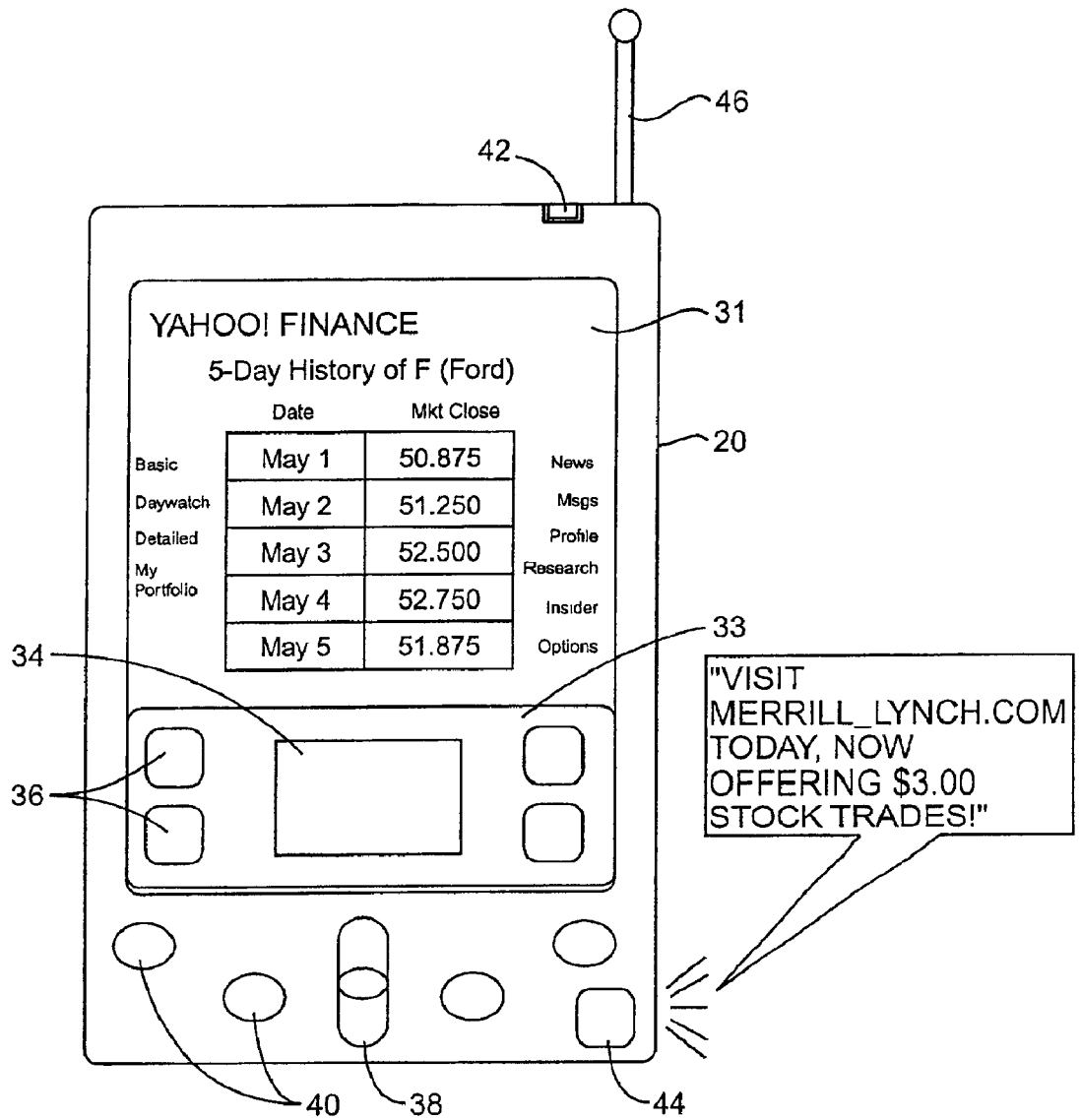
FIG. 1 is a schematic illustrating a handheld computer utilizing a system of the present invention to play audio advertisements to a user of the handheld computer while visual content is displayed on a viewing screen of the computer.

Referring now to the drawings, and first to FIG. 1, a handheld device 20 is shown displaying a Web page and playing an audio advertisement while the Web page is displayed on a screen 31 of the handheld device. According to a preferred embodiment, audio advertisements or "audio banners" are pushed to a handheld device's audio channel, leveraging its built-in voice facility. In this way, users can access Web content on a full size screen while listening to any accompanying audio advertisements. As previously discussed, handheld devices 20 typically include a viewing screen 31 that is limited in size. If advertisement banners containing text or graphic images are displayed on the screen 31, the space available for displaying Web content requested by the user is even further limited. The present invention allows audio banners to be downloaded to the handheld device 20 with minimal impact on visual content. The audio advertisements are associated with Web content and sent to the handheld computer 20 along with the Web content. In the example shown in FIG. 1, the Web content displayed on the handheld computer is information on a particular stock and the audio advertisement is for a stock Web site. Advertisers may select specific Web pages for their audio advertisements to be played in conjunction with the page being displayed. The audio advertisement of FIG. 1 is sent with a Web page displaying stock quotes, since viewers of this page typically would be interested in a stock related Web site. The audio advertisement may be selected, for example, based on the Web content requested by the user of the handheld device 20 or based on the type of handheld computer requesting the Web content (e.g., advertisement for product or service available for particular handheld device). It is to be understood, however, that the associated audio advertisement may not be related to the content displayed on the screen 31 or the type of handheld computer 20.

The handheld computer 20 is generally a mobile computing device that is sufficiently compact such that it can be held in a users hands and easily carried by the user. Examples of handheld computers include the following personal digital assistants (PDAs): Palm's PALM PILOT, Handspring's VISOR, Casio's CASSIOPEIA, Compaq's IPAQ, Hewlett Packard's JORNADA, NEC's MOBILEPRO, Novaltel's CONTACT WIRELESS, Sharp's MODILON, Vadem's CLIO, Apple's NEWTON, Research in Motion's BLACKBERRY, Franklin's REX, Symbol's SPT and PPT, and Psion's REVO, NETBOOK, and WORK-ABOUT. Handheld computers also include "smart" phones as described below. The term handheld computer, as used herein, generally includes any compact computing device operable to transfer content between itself and another computer. The term handheld computer also includes network appliances and devices which may be connected to a larger device, such as Clarion's AUTO PC, which is a personal assistant that can be placed in the dashboard of an automobile. Many of these handheld computers operate on a PalmOS platform, or use a Windows CE, MS Pocket PC, EPOC, Linux, Sun KVM, or other operating system. The handheld computer 20 is preferably a wireless device operable to communicate with a computer network such as the Internet or an intranet. The handheld computer 20 may also connect with a network using a wired connection (e.g., phone line or other connection). It is to be understood that the devices and operating systems listed above are merely provided as examples and that the invention is not limited to use with these devices and systems.

FIG. 1 represents any one of a variety of portable computing devices such as the handheld computer sold under the trademark PALMPILOT by Palm Corporation of Santa Clara, Calif. Most of the surface area of the handheld computer 20 consists of the screen display area 31 which is used to display information to the user. The screen display area 31 is covered with a touch sensitive digitizer pad that can detect user interaction with a stylus or finger. The screen display area 31 is limited in size (e.g., small as compared to conventional desktop or laptop screens). Below the display area 31 is a user input area 33 which is used to input text in a writing area 34 and interact with application buttons 36. Below the user input area 33 are a mechanical scrolling button 38 and application buttons 40. The application buttons 40 are used to execute applications such as an address book, calendar, To-Do list, synchronization application, or memo pad. The handheld computer 20 generally includes a suite of personal information management (PIM) applications such as an address book, daily organizer, To-Do list, and memo pad. A mechanical power button 42 is provided to turn the handheld computer 20 on and off. The handheld computer 20 further includes an audio device such as a speaker 44 operable to play audio messages to a user of the computer. The audio output device of the handheld computer may be configured such that it can be turned on and off by a user of the computer.

The handheld computer 20 includes an antenna 46 for establishing a wireless connection between the handheld computer and a network. The computer 20 may also include a modem to allow for the transfer of data over a phone line or other type of connections. The computer 20 further includes memory which can be utilized to store and retrieve software programs incorporating computer code that implements aspects of the invention, data for use with the invention, and the like. It is to be understood that the handheld computer 20 may be different than shown and described herein without departing from the scope of the invention. For example, the handheld computer may have a miniaturized keyboard and display screen such as included in the Hewlett Packard JORNADA 680.

The handheld computer 20 may also be a "smart" phone such as those manufactured by Nokia, Ericsson, NeoPoint, and Qualcomm. If the handheld computer is a cellular phone it may communicate with a base station transceiver (not shown) that is used to transmit and receive signals over a cellular network. The base station transceiver is controlled by a base station controller which is connected to a mobile switching center. The mobile switching center is connected to a public switched telephone network, which switches calls to other mobile stations, land based telephones, or the Internet. The battery powered, hand-held telephone communicates via RF links with a network of base stations that interface the signals on the RF links into the land-based public telephone network, as well known by those skilled in the art. The phone is operable to transmit and receive voice information as well as other types of data.

Figure 2:
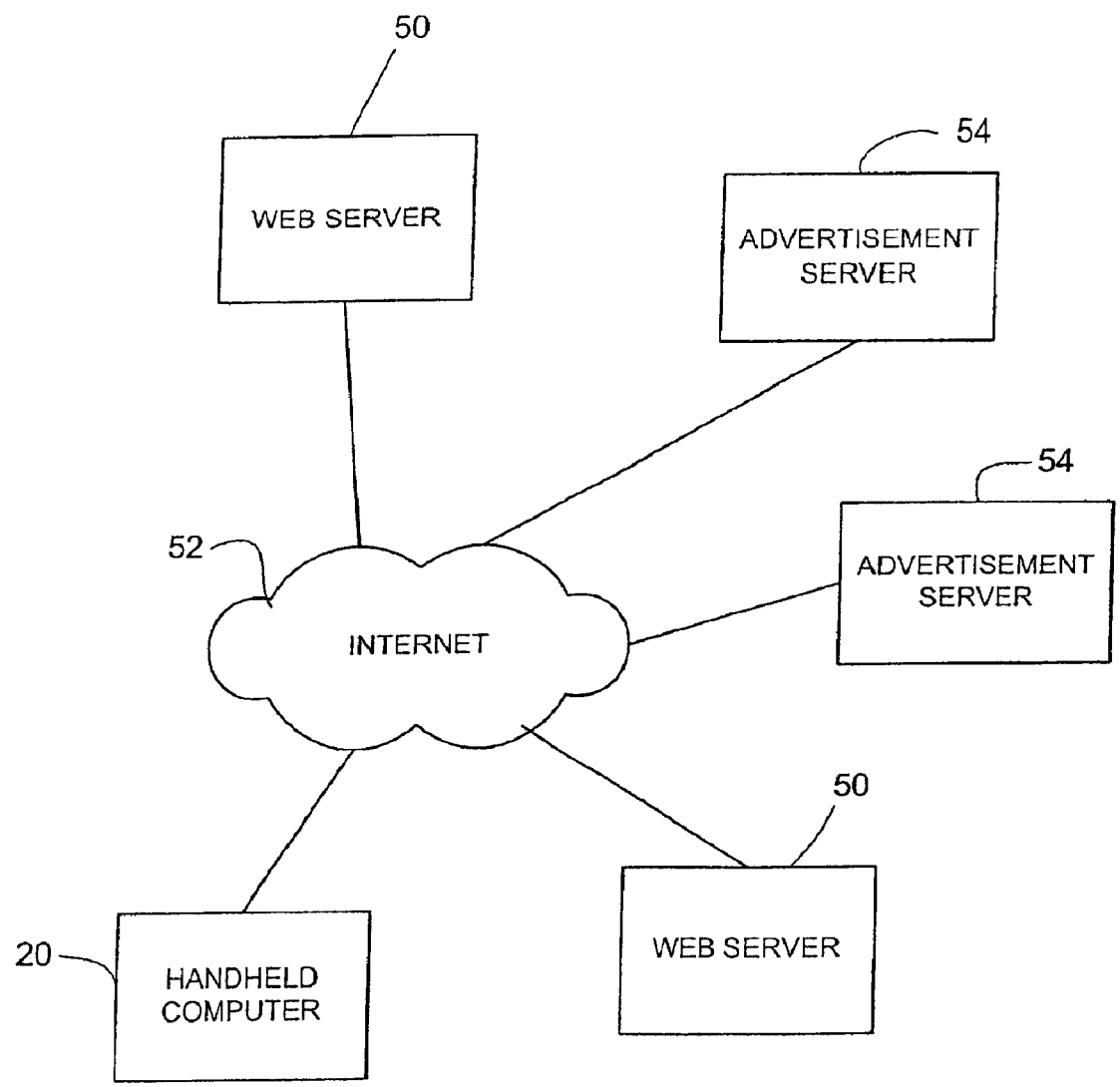
FIG. 2 is a schematic illustrating a network connected to a handheld computer and a plurality of servers hosting Web sites and advertisement sites.

The method and system of the present invention operate in the context of a network such as shown in FIG. 2. The handheld computer 20 is in communication with the network by wireless means or a wired connection, as previously described. The handheld computer 20 is used to receive content from an origin server (e.g., Web server) 50 over a network such as the Internet 52. The server 50 may be a host for a Web site on the Internet and may contain product information, software updates, or other marketing information related to the handheld computer 20 requesting content from the Web site or information related to the requested content, or marketing information for other products and services. Servers 54 store advertisements for presenting to a user when content is requested from a Web site. The Web sites may include a link to the advertisement sites so that the advertisements are sent to the handheld computer 20 and played in conjunction with the displaying of a Web page or other information. The server computers 50, 54 may support protocols for FTP (File Transfer Protocol) and HTTP (HyperText Transfer Protocol) and provide for the display and rendering of HTML (HyperText Markup Language) or other text interface descriptions. Each computer 50, 54 has an IP address that specifies its location on the network, thereby allowing the computers to communicate with each other in a conventional manner. The servers 50, 54 further include a network communication protocol layer that implements the necessary TCP/IP communication functions for connecting to the network and communicating with other computers. As described below, the advertisement servers 54 may be configured to convert text advertisements into audio advertisements for delivery to the handheld computer 20.

The audio banners may be pushed to the handheld device 20 in any of a variety of ways in accordance with the preferred embodiments. In one preferred embodiment, the audio banners are delivered "out of band" with respect to the Web page information using audio channels. A wireless service provider that operates as the advertisement server 54 may provide proper back-end coordination between the downloaded Web page and the audio channel.

Figure 3:
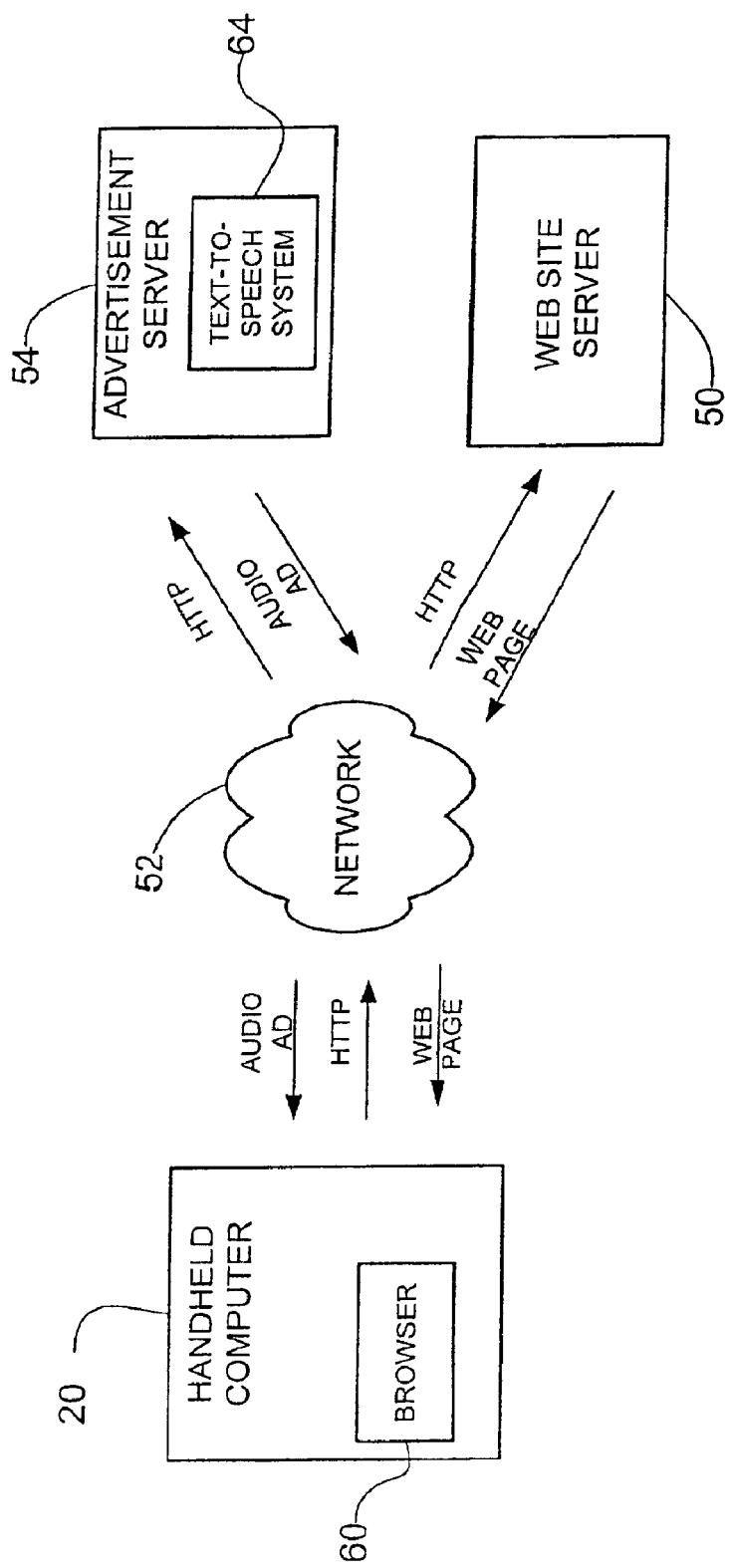
FIG. 3 is a schematic illustrating the transfer of content from a Web site and an advertisement site to a handheld computer, with the advertisement server configured to convert a visual advertisement to an audio advertisement.

FIG. 3 is a schematic illustrating the transfer of audio advertisements from the advertisement server 54 to the handheld computer 20. The Web site host 50 and advertisement server 54 are shown as different nodes on the network, however, the advertisements may also be sent from the same server delivering the Web content. When a user browsing on the Internet accesses a Web site, the user's browser 60 generates an HTTP message to get the information for the desired Web page. In response to the message, the Web site transmits one or more messages back containing information to be displayed by the user's browser on the handheld computer screen 31. The Web server 50 also sends a link including a URL address for the node running the advertiser server 54 and information about the page on which the advertisement will be displayed. The computer 20 uses the URL address of the desired banner information to access the computer network and request that the desired banner information be sent to the handheld computer. The advertising server 54 provides additional information comprising one or more audio advertisements to be played with the content provided from the Web site. Upon receiving an advertisement request, the advertisement server 54 determines which advertisement to provide to the user's browser 60 and transmits the messages containing audio advertisements to the user's browser.

The advertisement server 54 may store only audio advertisements or the server may be configured to convert text into audio when the device requesting the Web content is identified as a handheld computer 20. If the banner information is in a text format, it can be converted to audio using protocols such as voice-XML (voice extensible markup language). For example, the advertising server 54 (or a separate computer) may use a text-to-speech system 64 that supports Speech Synthesis Markup Language or Java Speech Markup Language to convert the text banner to an audio banner. The Speech Markup Language allows applications to annotate text with additional information that can improve the quality and naturalness of synthesized speech. Thus, text banners may be specifically designed to be played as audio banners. The speech output is generated from data input which may include plain text, formatted text, or binary objects, for example.

The text is first converted from HTML to Speech Markup Language. The text-to-speech system 64 uses an XML parser to extract content from the text document. The text document may include structure, tags, and attributes which are analyzed to determine the speech output. If there is no markup support in the text document, the text-to-speech system 64 infers the structure by automated analysis of the text, using punctuation and other language-specific data. Once the system 64 has determined the set of words to be spoken it converts those words into a string of phonemes (i.e., basic units of sound in a language). For non-markup documents, the system may look up words in a pronunciation dictionary and apply rules to determine related pronunciations. Prosody analysis is also performed to determine the pitch, timing, pausing, speaking rate, emphasis on words, or other features. The phonemes and prosodic information are used by the text-to-speech system 64 in the production of the audio waveform. For additional details of Speech Synthesis Markup Language, see "Speech Synthesis Markup Language Specification for the Speech Interface Framework", W3C Working Draft, dated Jan. 3, 2001, which is incorporated herein by reference in its entirety. It is to be understood that a system other than described herein may be used to convert text advertisements to audio advertisements without departing from the scope of the invention.

The user of the handheld computer 20 may turn off the audio channel if the user does not want to receive audio banners. The handheld computer 20 may be configured to send a notification to the advertisement server 54 that the audio channel is off so that the advertisement server sends text advertisements instead of audio advertisements. The advertisement server 54 may also send a visual warning to the user of the handheld computer 20 that the audio channel is not open. When the audio channel is opened, a notice is sent back to the advertisement server 54 so that the advertisement server can again send audio advertisements. The advertisement server 54 may also be configured to send a combination of audio and graphic advertisements. For example, the advertisement server 54 may send an audio advertisement along with a small graphical image or icon that the user can select if he wants to go to the advertised Web site.

Figure 4:
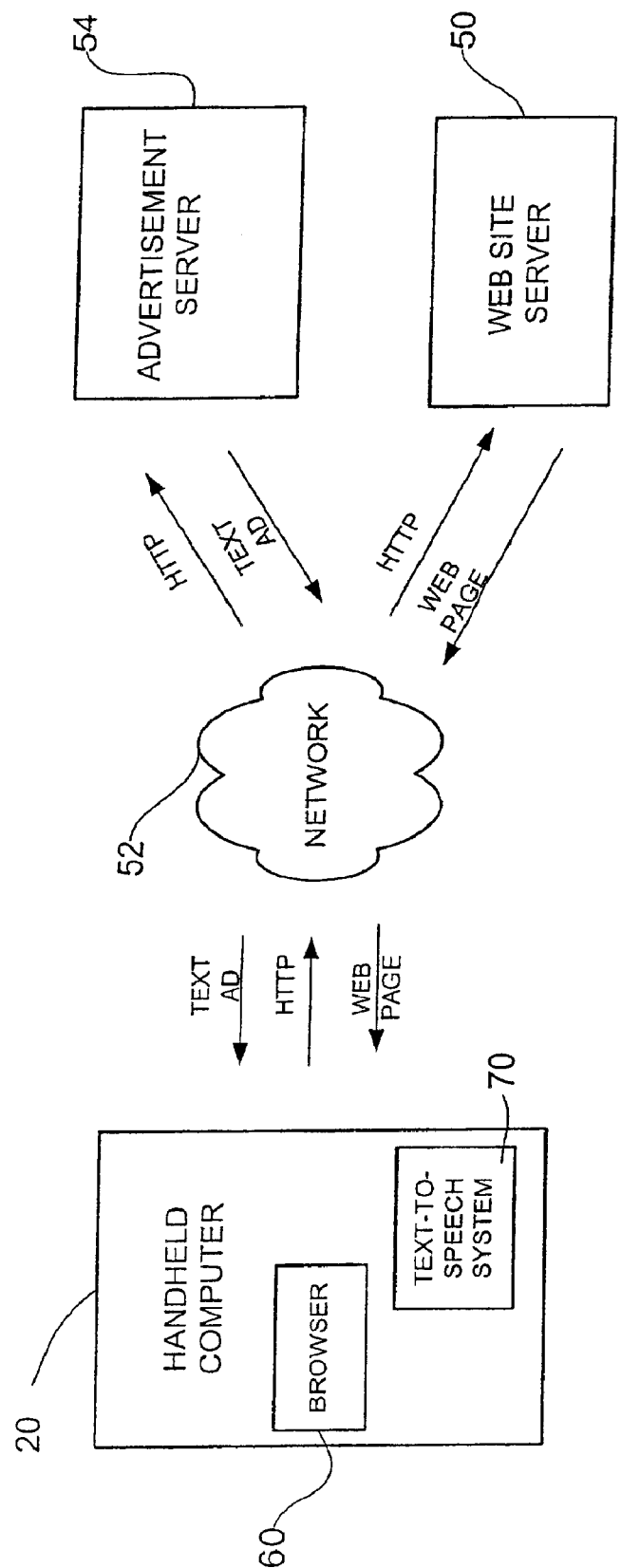
FIG. 4 is a schematic illustrating the transfer of content from a Web site and an advertisement site to a handheld computer, with the handheld computer configured to convert a visual advertisement to an audio advertisement.

An alternate embodiment is shown in FIG. 4. The system shown in FIG. 4 is similar to the system of FIG. 3 except that the advertisement server 54 is configured to send only text advertisements and the handheld computer 20 is configured to convert the text banner into an audio banner. The handheld computer 20 includes a text-to-speech application 70 that is operable to convert text advertisements to audio. The advertisement server 54 may be configured, for example, to send only simple text messages (e.g., only a few words) for ease of converting at the handheld computer 20 to reduce the processing time required by the text-to-speech application 70.

Figure 5:
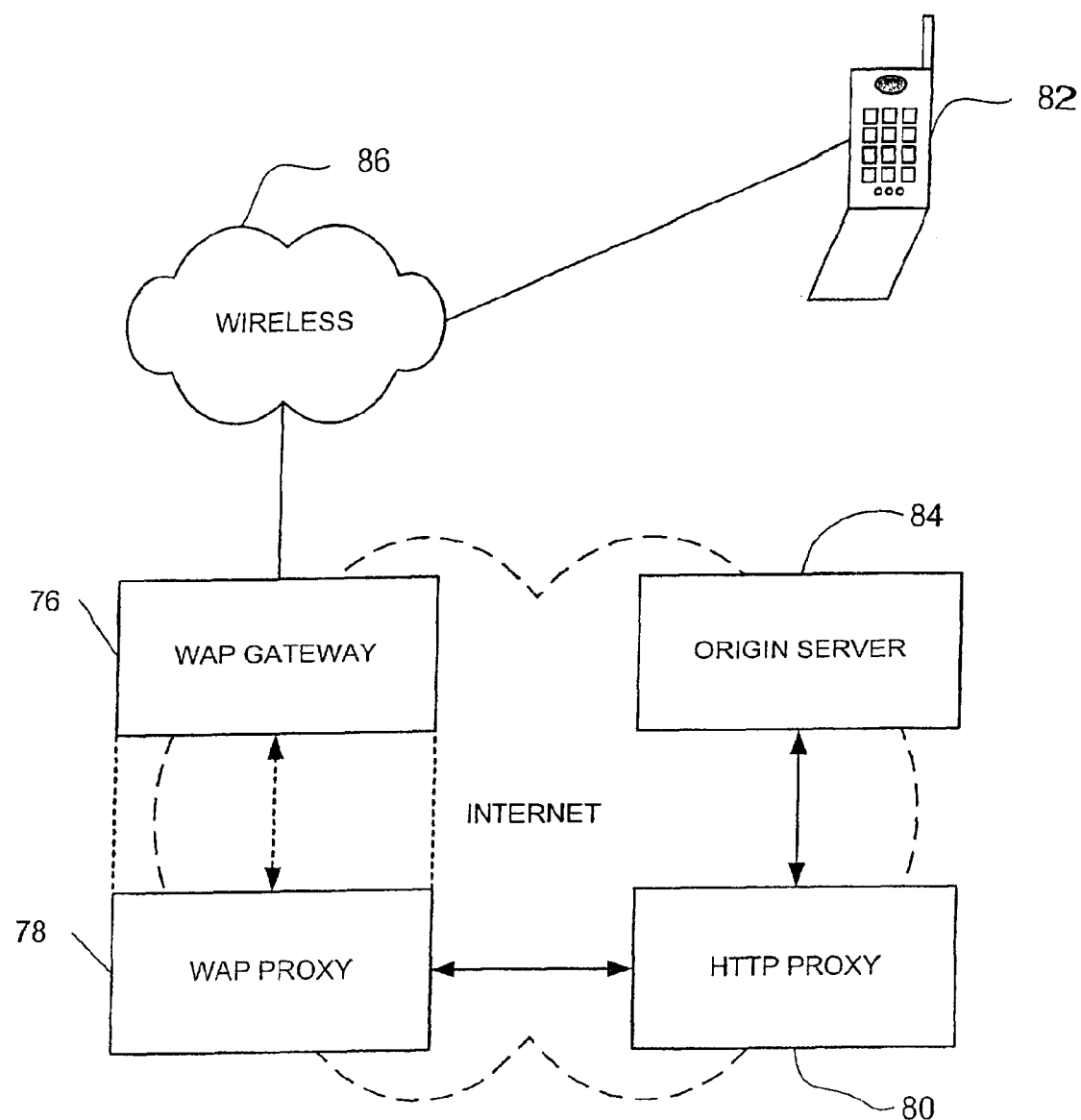
FIG. 5 is a schematic illustrating communication between a wireless handheld device and a server using a wireless access protocol (WAP).

In another preferred embodiment, the audio banners are delivered "in band" with respect to the Web page itself, by efficiently encoding the audio and encapsulating it within a WML (Wireless Markup Language) Web page, which is then played back by a WML browser or an auxiliary audio program associated with the WML browser. As shown in FIG. 5, a gateway 76 and one or more proxies 78, 80 may be used to transfer data over the network. The handheld device 82 may utilize the Wireless Application Protocol (WAP) described in Wireless Application Protocol, Wireless Application Environment Overview Version 1.3 (WAP-195-WAE Overview, Version 29-March-2000, published by the Wireless Application Protocol Forum), which is incorporated herein by reference in its entirety. The Wireless Application Protocol specifies an application framework and network protocols for wireless devices such as mobile telephones, pagers, and PDAs. WAP content and applications are specified in formats based on the World Wide Web (WWW) content formats. The handheld computer 82 includes an application referred to as a micro browser that operates in conjunction with a user interface to allow a user of the device to request and receive content from a server 84. The micro browser sends requests for named data objects to the server 84 and the server responds with data encoded using standard formats similar to a conventional Web browser used to obtain content on the Internet. The requests sent from the micro browser on the handheld computer 82 include Capability and Preference Information (CPI) which is transmitted over the wireless network within WSP (Wireless Session Protocol) headers. The CPI includes information about the handheld device 82, user, and network that will be processing the content contained in a WAP response.

As shown in FIG. 5, a system for transferring content between handheld computer 82 and the network server 84 with WAP includes the handheld computer 82 operable to request and receive content, the wireless network 86, WAP gateway 76, WAP proxy 78, HTTP proxy 80 and the origin server 84 operable to generate requested content and send an audio advertisement along with the requested content. The wireless device 82 is configured for requesting and receiving content from the origin (Web) server, which may be connected to the Internet or an intranet using TCP/IP based protocols. The HTTP proxy 80, WAP proxy 78, and WAP gateway 76 are also in communication with the Internet or an intranet.

The gateway 76 is responsible for translating WAP requests into HTTP requests for delivery over the Internet to the designated origin server 84. For example, the WAP gateway is preferably configured to translate requests from a WAP protocol stack (e.g., WSP), WTP (Wireless Transaction Protocol), WTLS (Wireless Transport Layer Security), and WDP (Wireless Datagram Protocol)) to a WWW protocol stack (HTTP and TCP/IP). When the gateway 76 forwards the requests, it also forwards the current CPI associated with the session or request. The gateway 76 is also responsible for translating HTTP responses into appropriate WAP responses for delivery over the wireless network 86 to the requesting handheld device 82.

As the request or response passes through the network, it may pass through one or more proxies (WAP proxy 78, HTTP proxy 80) responsible for forwarding the request to the particular origin server 84 designated in the request or the gateway 76 designated for the response. The proxies 78, 80 forward the CPI information and may add information to the CPI. The WAP proxy includes an HTML filter used to translate the HTML into WML. The HTTP proxy 80 includes software that receives HTTP requests and forwards the requests to the origin server 84 using HTTP. The proxy 80 receives a response from the origin server 84 and forwards it to the requesting handheld computer 82.

The origin server 84 is the final recipient of the request initiated by the handheld computer 82 and forwarded as an HTTP request from the WAP proxy 78. The origin server 84 receives the request and generates appropriate content that is subsequently transmitted as an HTTP response to the WAP proxy 78. An audio advertisement is sent with the requested content. In generating this response, the origin server 84 extracts the CPI conveyed with the HTTP request and may use that information to select or otherwise customize the content and advertisement delivered to the client.

The CPI may be used, for example, to provide the server 84 with information about the wireless device 82 and send advertisements specifically targeted at a user of the device based on characteristics of the device 82 transmitted to the server during a wireless protocol session between the wireless device and the server. Information such as the manufacturer and model number of the device 82 or software formats the device supports may be used to offer the user specific hardware accessories for the wireless device or software upgrades. This allows for the marketing of products based on the individual user's wireless device 82 and the configuration of software installed on the device. A method for utilizing wireless protocol information for marketing opportunities is further described in U.S. patent application Ser. No. 09/704,061, referenced above. It is to be understood that wireless Internet protocols such as I-mode may also be used without departing from the scope of the invention.

It is to be appreciated that in-band or out-of-band delivery mechanisms other than described herein for the audio banners may be used without departing from the scope of the preferred embodiments.

Figure 6:
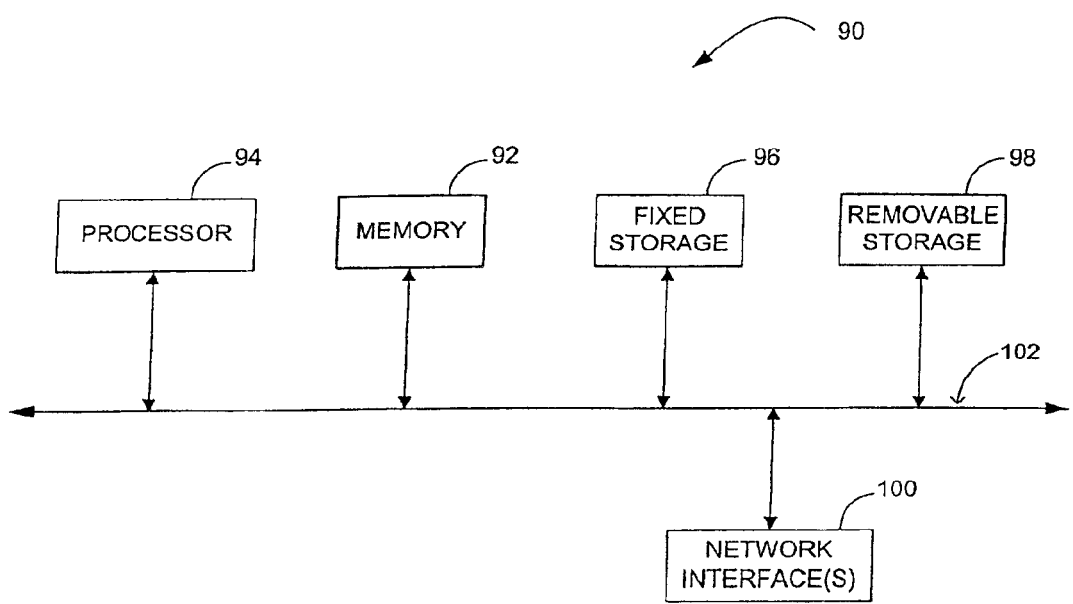
FIG. 6 is a block diagram illustrating an example of a computer system that can be utilized to execute software of an embodiment of the invention.

FIG. 6 shows a system block diagram of computer system 90 that may be used as the Web site server, advertisement server, or other computer system to execute software of an embodiment of the invention. The Web and advertisement servers 50, 54, 84 are conventional server type computers, preferably supporting a large number of multiple clients simultaneously for requests for data and other processing operations. The computer system 90 includes memory 92 which can be utilized to store and retrieve software programs incorporating computer code that implements aspects of the invention, data for use with the invention, and the like. Exemplary computer storage media include CD-ROM, floppy disk, tape, flash memory, system memory, and hard drive. Additionally, a data signal embodied in a carrier wave (e.g., in a network including the Internet) may be the computer storage medium. Computer system 90 further includes subsystems such as a central processor 94, fixed storage 96 (e.g., hard drive), removable storage 98 (e.g., CD-ROM drive), and one or more network interfaces 100. Other computer systems suitable for use with the invention may include additional or fewer subsystems. For example, computer system 90 may include more than one processor 94 (i.e., a multi-processor system) or a cache memory. The computer system 90 may also include a display, keyboard, and mouse (not shown) for use as a host.

The system bus architecture of computer system 90 is represented by arrows 102 in FIG. 6. However, these arrows are only illustrative of one possible interconnection scheme serving to link the subsystems. For example, a local bus may be utilized to connect the central processor 94 to the system memory 92. Computer system 90 shown in FIG. 6 is only one example of a computer system suitable for use with the invention. Other computer architectures having different configurations of subsystems may also be utilized. Communication between computers within the network is made possible with the use of communication protocols, which govern how computers exchange information over a network, as is well known by those skilled in the art.

Figure 7:
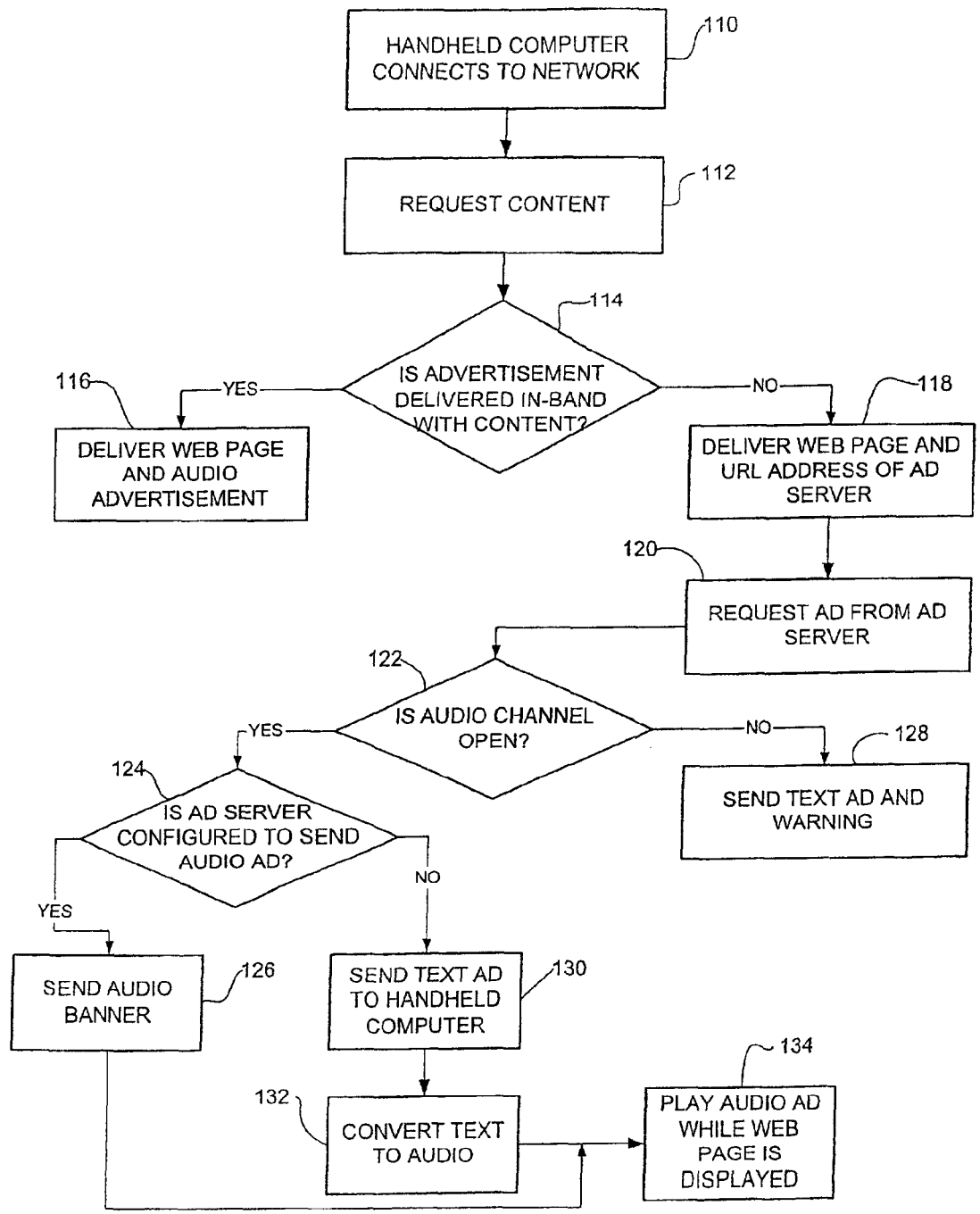
FIG. 7 is a flowchart illustrating a process for presenting audio advertisements to a handheld computer.

FIG. 7 is a flowchart illustrating a process for sending an audio advertisement in conjunction with a visual Web page to handheld computer 20. At step 110, the handheld computer connects to the network 54. The user requests Web content by entering a URL into the browser (step 112). The browser generates an HTTP request, or other type of request, to get the information for the desired Web page. If the advertisement is sent in-band with the Web page it is delivered along with the Web page (steps 114 and 116). The audio advertisement may be sent as audio or as text and converted to audio as described below for the out-of-band advertisement. If the advertisement is sent out-of-band with the Web page, the Web server sends the Web page to the browser of the handheld computer 20 and the URL address of the advertisement server to the browser which in turn requests the advertisement from the advertisement server (steps 118 and 120). If the audio channel is turned on at the handheld computer and the advertisement server is configured to send audio advertisements, an audio banner is sent to the handheld computer 20 (steps 122, 124, and 126). If the audio channel is not turned on, the advertisement server sends a text advertisement to the handheld computer and a request that the audio channel be turned on (steps 122 and 128). If the handheld computer 20 is configured to convert the text advertisement to audio, the advertisement server sends a text advertsiement to the handheld computer which converts the text advertisement into an audio banner (steps 130 and 132). The audio advertisement is then played on the handheld computer 20 while the Web page is displayed on the screen 31 of the computer (step 134).

It will be observed from the foregoing that the method and system of the present invention provide a novel business model and architecture for portals to deliver advertisements to wireless users in a practical manner. Importantly, audio advertisements leverage the handheld computer's built-in voice facility, thus allowing users to access Web content on a full size screen while listening to accompanying audio advertisements.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A computer implemented method for providing advertising to a handheld computer operable to connect to a network, the handheld computer having a screen for displaying visual content received from the network and configured for playing an audio message associated with the visual content, the method comprising:

receiving a request for content from the handheld computer;

associating an advertisement with the request for content;

sending the requested content to the handheld computer for display on the screen of the computer; and sending the associated advertisement from an advertisement server to the handheld computer for playing over an audio output device of the handheld computer;

wherein the audible advertisement is played simultaneously with the display of the requested content on the handheld computer, free of a visual advertisement for preserving space available on the screen for the purpose of solely displaying the requested content;

wherein sending the associated advertisement comprises sending a visual warning when an audio channel of the handheld computer is turned off;

wherein upon the audio channel being opened, a notice is sent to the advertisement server so that the advertisement server can again send the audible advertisement.

2. The method of claim 1 further comprising converting a text advertisement to an audio advertisement.

3. The method of claim 1 wherein the network is the Internet and receiving a request for content comprises receiving an HTTP request.

4. The method of claim 3 wherein associating an advertisement with a request for content comprises sending a link to an advertisement server along with the requested content.

5. The method of claim 4 wherein the requested content is sent from a server hosting a Web site.

6. The method of claim 1 wherein the request for content identifies the source as a handheld computer.

7. The method of claim 1 further comprising establishing a wireless connection between the handheld computer and the network.

8. The method of claim 7 wherein sending the associated advertisement comprises sending the advertisement in-band with the requested Web content.

9. The method of claim 7 wherein sending the requested content and associated advertisement comprises utilizing a wireless access protocol.

10. The method of claim 1 further comprising receiving information about the handheld computer requesting content.

11. The method of claim 10 wherein associating an advertisement with the request for content comprises associating an advertisement based on the information received about the handheld computer.

12. The method of claim 1 wherein associating an advertisement with the request for content comprises associating an advertisement based on the content requested.

13. The method of claim 1 wherein sending the associated advertisement comprises sending the advertisement in an audio format.

14. The method of claim 1 wherein sending the associated advertisement comprises sending the advertisement in a text format that can be converted to speech.

15. A computer implemented method for providing advertising to a handheld computer operable to establish a wireless connection with a network and having a screen for displaying visual content received from the network, the handheld computer being configured for playing an audio advertisement associated with the visual content, the method comprising:

sending a request for visual content from the handheld computer to the network;

receiving the requested content and displaying the content on the screen of the handheld computer; and receiving an advertisement associated with the visual content from an advertisement server and playing the advertisement on the handheld computer;

wherein the advertisement is audible and played simultaneously with the display of the requested content on the handheld computer, free of a visual advertisement for preserving space available on the screen for the purpose of solely displaying the requested content;

wherein a visual warning is received when an audio channel of the handheld computer is turned off;

wherein upon the audio channel being opened, a notice is sent to the advertisement server so that the advertisement server can again send the audible advertisement.

16. The method of claim 15 wherein the network is the Internet and sending a request for visual content comprises sending an HTTP request from a browser installed on the handheld computer.

17. The method of claim 16 wherein receiving the requested content comprises receiving the requested content from a server hosting a Web site.

18. The method of claim 15 wherein receiving the advertisement comprises receiving a text advertisement and further comprising converting the text advertisement to an audio advertisement at the handheld computer.

19. The method of claim 15 wherein sending a request for visual content comprises sending a request in a wireless application protocol and wherein characteristics of the handheld computer are contained within a wireless application protocol header.

20. The method of claim 19 wherein the advertisement associated with the visual content is based on the characteristics of the handheld computer.

21. The method of claim 15 wherein the advertisement associated with the visual content is based on the content requested.

22. A computer program product for providing advertising to a handheld computer having a screen for displaying visual content received from a network and configured for playing an audio advertisement associated with the visual content, comprising:

computer code that receives a request for content from the handheld computer;

computer code that associates an advertisement with the request for content;

computer code that sends the requested content to the handheld computer;

computer code that sends the associated advertisement from an advertisement server to the handheld computer for playing over an audio output device of the handheld computer; and a computer readable medium that stores said computer codes;

wherein the audible advertisement is played simultaneously with the display of the requested content on the handheld computer, free of a visual advertisement for preserving space available on the screen for the purpose of solely displaying the requested content;

wherein sending the associated advertisement comprises sending a visual warning when an audio channel of the handheld computer is turned off;

wherein upon the audio channel being opened, a notice is sent to the advertisement server so that the advertisement server can again send the audible advertisement.

23. A system for providing advertising to a handheld computer operable to establish a wireless connection with a network and having a screen for displaying visual content received from the network, the handheld computer being configured for playing an audio message associated with the visual content, the system comprising:

a processor operable to receive a request for content from the handheld computer, associate advertisement configured for audio output with the requested content, send the requested content in a visual format to the handheld computer, and send the associated advertisement to the handheld computer for audio output therefrom while the requested content is displayed on the handheld computer; and memory for storing the requested content and advertisements;

wherein the audible advertisement is played simultaneously with the display of the requested content on the handheld computer, free of a visual advertisement for preserving space available on the screen for the purpose of solely displaying the requested content;

wherein sending the associated advertisement comprises sending a visual warning when an audio channel of the handheld computer is turned off;

wherein upon the audio channel being opened, a notice is sent to an advertisement server so that the advertisement server can again send the audible advertisement.

24. The system of claim 23 further comprising a text-to-speech system operable to convert text advertising messages to audio advertising messages.

25. The system of claim 23 wherein the processor is located within a host for a Web site and the network is the Internet.

* * * * *